United States Patent [19]
Fukatsu

[11] 3,772,044
[45] Nov. 13, 1973

[54] HEAT SHOCK RESISTANT HEAT FUSED REFRACTORY PRODUCTS HAVING MgO OF MAIN COMPONENT

[75] Inventor: Yukio Fukatsu, Yokohama, Japan

[73] Assignee: Asahi Glass Company, Limited, Tokyo, Japan

[22] Filed: Dec. 29, 1971

[21] Appl. No.: 213,426

[30] Foreign Application Priority Data
Dec. 30, 1970 Japan.............................. 45/122656

[52] U.S. Cl..................................... 106/59, 106/63
[51] Int. Cl............................................. C04b 35/42
[58] Field of Search................................ 106/59, 63

[56] References Cited
UNITED STATES PATENTS

| | | | |
|---|---|---|---|
| 3,201,267 | 8/1965 | Slaughter............................... | 106/59 |
| 3,284,217 | 11/1966 | Walther................................. | 106/59 |
| 3,391,011 | 2/1968 | Alper et al............................. | 106/59 |
| 3,540,899 | 11/1970 | Alper et al............................. | 106/59 |

*Primary Examiner*—James E. Poer
*Attorney*—Norman F. Oblon et al.

[57] ABSTRACT

A heat shock resistant heat fused refractory product having an MgO phase which contains (1) a base structure compound mainly of melted and resolidified periclase crystals, in which needle or tabular ribbon type $CaO \cdot Cr_2O_3$ (calcium chromite) crystals are dispersed, and (2) coarse particles of MgO.

4 Claims, No Drawings

3,772,044

HEAT SHOCK RESISTANT HEAT FUSED REFRACTORY PRODUCTS HAVING MgO OF MAIN COMPONENT

BACKGROUND OF THE INVENTION

1. Field of the Invention

This invention relates to a heat fused refractory product. More particularly, this invention relates to MgO type of a heat fused refractory product having excellent corrosion resistance and heat shock resistance.

2. Description of the Prior Art

Recent developments in steel making techniques, particularly in the recently developed oxygen blowing process for steel production, have created a demand for a refractory product which can be used over a long period of time under severe operating conditions. Previously, fired or unfired bonded refractories, such as magnesia or dolomite, were used for high temperature use, and although these materials were generally satisfactory, they were incapable of with-standing particularly severe operating conditions for any extended period of time.

It is known that certain heat fused refractory products will have a structure which is significantly more dense than conventional bonded refractory products, and have a greater degree of corrosion and abrasion resistance than conventional bonded refractory products. Conventional heat fused refractories have been commercially prepared from $MgO - Cr_2O_3 - Al_2O_3 - FeO_3$ systems, and from various other MgO-containing systems. While these conventional products have been found to have excellent high temperature corrosion and abrasion resistance, they are generally characterized by inadequate heat shock resistance, i.e., insufficient spalling resistance. It is believed that this difficulty is a result of the high density and high rigidity of these products, the precise characteristic which has enabled the other superior properties.

SUMMARY OF THE INVENTION

Accordingly, it is one object of this invention to provide an improved heat fused refractory product.

It is another object of this invention to provide a heat fused refractory product which possesses excellent heat shock resistance and spalling resistance.

It is a further object of this invention to provide a heat fused refractory product which has very high corrosion resistance to corrosive materials, such as steel slag and melted metal.

These and other objects and advantages of this invention, as will become clear from the following description, have been attained by dolomite type heat fused refractory product, instead of the conventional dolomite type fired or unfired refractory product. The heat fused refractory product of this invention has (1) a base structure consisting mainly of melted and resolidified periclase crystals in which needle or tabular ribbon type $CaO . Cr_2O_3$ (calcium chromite) crystals are dispersed, and (2) coarse MgO phase particles. Chemically, this composition comprises more than 50% by weight of MgO, except the coarse particles of MgO phase, more than 5% by weight CaO and more than 3% by weight of $Cr_2O_3$, which is more than one-sixth of the amount of CaO, and less than 5% by weight of $Al_2O_3$, when the amount of CaO is more than 3 times that of the $Cr_2O_3$

DETAILED DESCRIPTION OF THE PREFERRED EMBODIMENT

Fused refractory materials are produced by melting and resolidifying refractory materials to form a solidified refractory mass. In the present process, coarse particles containing essentially MgO, are admixed into the molten refractory materials prior to solidification. Accordingly, it is desirable, from the standpoint of preparing a good dispersion, to mix the coarse particles with the molten refractory components as they are poured into a suitable mold where cooling and solidification occurs.

The heat fused refractory product can be prepared by admixing the desirable refractory material components, completely heat melting the mixture in an electric arc furnace, pouring the molten refractory material in a mold supplying MgO clinker to the flow of the molten refractory material, and then cooling and solidifying the molten refractory material in the mold.

It can be shown that a crystalline structure is formed by cooling and resolidifying the molten components when coarse particles of MgO are admixed therewith prior to solidification.

The coarse particles are largely incorporated into the structure at the crystal interfaces wherein a portion of the $Cr_2O_3$ is diffused into the coarse particulate MgO phase. It can be shown by photomicrograph that, the refractory product is made of periclase single crystals with tabular type or needle type $CaO . Cr_2O_3$ crystals dispersed between the base crystals, and a border portion between the periclase crystals. The heat fused refractory product of this invention therefore is characterized by $CaO . Cr_2O_3$ crystals and coarse MgO-containing particles separately dispersed through the molten refractory material. The base crystal structure consists essentially of periclase crystals, wherein the periclase crystals have an average length of about $100\mu$, such as $50 - 150\mu$.

The actual structure of the resulting product will largely be dependent upon the particular refractory materials used. It is possible, for instance, to obtain a structure having the matrix and/or $CaO . Cr_2O_3$ crystals at the border of all the periclase crystals.

The $CaO . Cr_2O_3$ crystals will usually either partially or wholly cross the periclase crystals and will be crystallized in the form of a needle or tabular ribbon. The actual amount of $CaO . Cr_2O_3$ crystals present in the refractory will depend upon the following condition, and should be present in sufficient quantities and in sufficient structural form so as to provide sufficient spalling resistance of the periclase refractory product. If the quantity of CaO is too great, single crystals of CaO will be formed with the periclase crystals.

The molten refractory material for forming the base crystal structure is resolidified to form the $CaO . Cr_2O_3$ containing periclase crystals. The quantities of ratios of the components of the refractory, excluding the MgO phase, are as follows:

|  | Preferably Ratio (wt. %) | Most preferable ratio |
|---|---|---|
| MgO | more than 50% | 60 – 80% |
| CaO | 5 – 40% | 5 – 25% |
| $Cr_2O_3$ | more than 3% | 10 – 25% |
| $Al_2O_3$ | less than 5% (in $CaO>3Cr_2O_3$) | less than 5% (in $CaO>3Cr_2O_3$) |
| MgO + CaO |  | more than 60% |
| $Cr_2O_3$ | more than 1/6 CaO | more than 1/6 CaO |
| $SiO_2$ |  | less than 4% |
| $Fe_2O_3$* | (in $CaO>3Cr_2O_3$) | less than 2% |

* Although Fe oxide can exist in the form of FeO in the refractory product of this invention, the quantity of Fe oxide is calculated as $Fe_2O_3$ for convenience.

The MgO component can be conveniently supplied in the form of magnesia clinker. The $CaO \cdot Cr_2O_3$ can be formed from separate sources of CaO and $Cr_2O_3$. The CaO may conveniently be used in the form of quick lime, limestone or other calcium compound, such as dolomite. Chromite can most economically be used as the source of $Cr_2O_3$, although purified $Cr_2O_3$ may be used for specialty purposes, since $Al_2O_3$ and $Fe_2O_3$ are contained in chromite. Of course, other Cr and Ca minerals and compounds may be used.

The purpose of the $CaO \cdot Cr_2O_3$ is to impart spalling resistance to the resulting heat fused refractory product so that the product will be capable of withstanding sudden changes in temperature without cracking.

The principal crystals of the base structure are periclase crystals, and the amount of the MgO component should be at least 50%, and preferably 60 – 80% to yield a highly corrosive resistant product.

The amount of $Cr_2O_3$ should be greater than 3%, particularly greater than 5%; and the amount of CaO should be greater than 5% (preferably less than 20%). The amount of $Al_2O_3$ should be less than 5%, when $CaO>3Cr_2O_3$, and the amount of $Fe_2O_3$ (FeO) should be less than 2%, when $CaO>3Cr_2O_3$. The ratio of $Cr_2O_3$ to CaO is $Cr_2O_3 > 1/6$ CaO. The lower limit of MgO is indispensable for providing excellent corrosion resistance properties, particularly when the refractory product is intended to be used in slag-converter furnaces. The upper limits of $Fe_2O_3$ and $Al_2O_3$ are necessary to form an appropriate amount of $CaO \cdot Cr_2O_3$ crystals in the resulting heat fused refractory product. When the amount of $Fe_2O_3$ is above the stated limit, $2CaO \cdot MgO \cdot Fe_2O_3$ crystals are formed in the product, whereby a portion of the $Cr_2O_3$ is solid soluted in the $2CaO \cdot MgO \cdot Fe_2O_3$ crystals, and the amount of $Cr_2O_3$ required for forming $CaO \cdot Cr_2O_3$ will be decreased. On the contrary, in the range of $CaO>3Cr_2O_3$, containing a large amount of free CaO, $Al_2O_3$ is reacted with CaO, whereby the amount of CaO required for forming $CaO \cdot Cr_2O_3$ is decreased.

When $CaO>3Cr_2O_3$, the effect of $Al_2O_3$ is complicated, but is not always disadvantageous. The ratio of CaO to $Cr_2O_3$ is important since when CaO is used in excess, a portion of the Cr will be converted to $Cr^{+6}$, whereby the amount of $CaO \cdot Cr_2O_3$ crystal made of $Cr^{+3}$ will be decreased.

It is preferable to prevent fluorine component contamination in the product since it could act to decrease the corrosion resistance of the product. When $SiO_2$ is included in the mixture, the formation of Ca-silicate (mainly $2CaO \cdot SiO_2$) will occur to the partial exclusion of the formation of $CaO \cdot Cr_2O_3$. Moreover, if an excess amount of $SiO_2$ is present, the corrosion resistance will be decreased. Accordingly, the amount of $SiO_2$ should preferably be limited to 4%.

The refractory product of this invention has excellent heat shock resistance because the principal component of the base structure of periclase crystals contains needle or tabular type $CaO \cdot Cr_2O_3$ crystals.

The coarse magnesium particles are combined with the base crystal structure. These particles provide long-term durability even under severe heat conditions.

The coarse particles can conveniently be admixed with the molten refractory material while the molten material is poured into a mold. Although the surface of the coarse magnesia particles are often melted by the heat of the molten refractory material, the entire particles are not and hence they are incorporated with the base crystalline structure essentially intact. Although the greater the quantity of said particles, the greater will be the spalling resistance of the resulting product, it is quite difficult to admix more than 40% by volume of the magnesia coarse particles by ordinary means. If too little coarse magnesia particles are used, very little spalling resistance improvement is obtained, whereas if the amount of the coarse magnesia particles used is too great, the bonding of the coarse magnesia particles to the molten refractory material will not be satisfactory, and hence the characteristic properties of the heat fused refractory product will be deleteriously affected. Accordingly, it is preferable to use 6 – 20% by volume of the coarse magnesia particles.

The use of the coarse magnesia particles increases the MgO content in the heat fused refractory product, without difficulties attendant in melting the refractory materials, and moreover, it suppresses the growth of cracks in the heat fused refractory product to provide excellent spalling resistance. The most preferable coarse magnesia particles used for this invention are the high purity calcined magnesia clinker having a MgO content of greater than 94%. It is possible to use calcined or uncalcined dolomite clinker having a MgO content of more than 50% or a product prepared by melting and resolidifying which contains more than 50% of MgO.

The particle size of the coarse magnesia particles used should be 1 – 20 mm., and preferably 3 – 10 mm. in diameter. These particles can be incorporated into the molten refractory mixture as the molten mixture is poured into the refractory mold. Alternatively, the coarse magnesia particles may be admixed with the molten refractory material after the molten materials are poured into the mold or even in an electric furnace used to melt the refractory materials. Al Having generally described the invention, a further understanding can be attained by reference to certain specific Examples which are provided herein for purposes of illustration only and are not intended to be limiting in any manner unless otherwise specified.

EXAMPLES

The compositons of the refractory raw materials stated in Table I were used for preparing a refractory batch:

TABLE I (% by weight)

|  | Dolomite clinker | Magnesia clinker | Limestone | Chromium oxide |
|---|---|---|---|---|
| MgO | 40.9 | 97.6 | 0.7 |  |
| CaO | 58.0 | 1.2 | 95.8 |  |
| $SiO_2$ | 0.4 | 0.5 | 1.7 |  |
| $Fe_2O_3$ | 0.1 | 0.1 | 0.1 |  |
| $Al_2O_3$ | 0.3 | 0.3 | 0.2 |  |
| $Cr_2O_3$ |  |  |  | >99.3 |
| $SO_4$ |  |  |  | <0.3 |
| Ignition loss | 0.2 |  | 1.3 | <0.3 |

The six types of the batches of refractory materials were each completely melted at about 2,600°C. (highest temperature) in an electric furnace. The results of chemical analysis of the molten refractory material after cooling and resolidifying are shown in Table II.

TABLE II

|  | Present Invention | | | Reference | | |
|---|---|---|---|---|---|---|
|  | A | B | C | D* | E* | F* |
| MgO | 70.4 | 63.6 | 70.2 | 58.5 | 41.4 | 51.5 |
| CaO | 15.1 | 14.2 | 24.0 | — | 11.2 | 8.1 |
| $Al_2O_3$ | 0.4 | 0.3 | 0.3 | 0.3 | 0.5 | 5.2 |
| $Fe_2O_3$ | 0.1 | 0.1 | 0.1 | 2.3 | 1.8 | 1.2 |
| $SiO_2$ | 0.3 | 0.3 | 0.3 | 0.3 | 0.3 | 0.4 |
| MgO + CaO | 85.7 | 77.8 | 94.4 | 58.9 | 52.6 | 59.9 |

The molten refractory material was poured through a tap hole of the electric furnace and sintered magnesia clinker was admixed within the molten refractory material by being introduced into the flow of molten refractory materials, at the rate of 120 g./sec. or 100 g./sec. in a heat resistant conduit pipe made of stainless steel having an inner diameter of about 25 mm. The mixture was poured into a mold and was cooled to yield a refractory product of about 500 × 230 × 130 mm. (Products A', B', C', D', E', and F') in size. The magnesia clinker used for said process had a purity of more than 98% and a particle mesh size of 1 – 4. The structures of the refractory products A', B', C', D', E', and F' were respectively as follows. The refractory products A', B', and C' of this invention were found to consist of main crystals of periclase particles in the base crystal structure, formed by melting and resolidifying. The periclase particles contained needles or tabular crystals of CaO · $Cr_2O_3$ (i.e., crystals which appeared needle-shaped in a sectional view). The base crystal structure contained calcium oxide crystals (especially in C') and 9CaO · 4$Cr_2O_3$ crystals and Ca-silicate type fine crystals or glass material were found between the periclase crystals. The coarse particles of MgO clinker were substantially uniformly dispersed in the base crystal structure, and the amount of the MgO clinker was respectively about 11% by volume in A' or B' and about 8% in C'. In D', E', and F', the volume of MgO clinker was almost the same as in products A', B'. However, refractory product D' did not contain CaO · $Cr_2O_3$ crystals and refractory product F' contained only negligible amounts of CaO . $Cr_2O_3$.

The refractory product E' contained a small quantity of CaO . $Cr_2O_3$ crystals which is considerably less than the amount of crystals expected from the quantity of $Cr_2O_3$ used. The test results of the heat shock resistance and the corrosion resistance of the refractory products are shown respectively in Tables III and IV. The heat shock resistance was measured by inserting 5 samples (500 × 230 × 130 mm.) in a gas furnace at 1,000°C. to quickly heat the 230 × 130 mm. surface for 30 minutes. They were then removed from the gas furnace for an additional 30 minutes. This constituted one complete cycle for heat shock purposes. The number of cycles before exfoliation was measured for each sample and is reported in Table III.

TABLE III

|  | A' | B' | C' | D' | E' | F' |
|---|---|---|---|---|---|---|
| Heat shock resistance | >4 | >4 | >4 | 2-3 | >4 | 2 |

The heat shock resistances of the refractory products prepared by use of the above molten refractory material A, B, C, D, E or F without coarse magnesia particle in the same type of mold, cooling and resolidifying, are shown in Table IV.

TABLE IV

|  | A | B | C | D | E | F |
|---|---|---|---|---|---|---|
| Heat shock resistance | 3 | 2-3 | 4 | <1 | >4 | <1 |

1. Corrosion resistance was measured by use of a small size converter furnace 240 mm. in diameter, covered with said sample and with a standard sample on the inner wall, and repeating 4 – 10 times. Refining of about 30 kg. of molten iron was repeated 4 – 10 times over a period of about 20 minutes per cycle. The corrosion loss of the sample was measured. The ratio of corrosion loss of standard sample to that of the test sample is shown in Table V. The standard sample was a conventional basic heat fused refractory product ($Al_2O_3$ 17%, MgO 55%, $Fe_2O_3$ 8%, $Cr_2O_3$ 17%, CaO 1%, $SiO_2$ 1.5%).

2. Corrosion resistance was then measured by use of a converter furnace, 650 mm. in diameter, covered with blocks of the test refractory products (230 × 130 + 194/144 mm.) on the inner wall. Refining of about 800 kg. of the molten iron was repeated 15 – 20 times over a period of about 15 minutes per cycle, and corrosion loss of the sample was measured. The corrosion loss was compared with that of a standard sample of basic heat fused refractory product, as mentioned in (1) and the corrosion resistance is shown as the ratio of corrosion loss of standard samples to that of the test sample.

3. Corrosion resistance was then measured by use of a crucible made of fired brick, prepared from fused magnesia in which about 50 g. of an artificial slag and 210 g. of molten iron were charged as a corrosive agent. These agents were melted at about 1,650°C. using a high frequency source, and the square column type samples (6.5 × 4.7 mm. of sectional area) were dipped into the molten corrosive agent for 1 hour. The quantity of loss of sample (the direction of 6.5 mm.) was measured. The loss was compared with that of heat fused refractory product as mentioned at (1) and the corrosion resistance is shown as the ratio of the loss of the standard sample to that of the test sample.

TABLE V

|  | A' | B' | C' | D' | E' |
|---|---|---|---|---|---|
| (1) measurement | — | 2.0 | 1.8 | 1.4 | 0.9 |
| (2) measurement | 2-3 | — | — | — | — |
| (3) measurement | 3.5 | — | — | 4.0 | 1.2 |
| (—) : no data | | | | | |

Having now fully described the invention, it will be apparent to one of ordinary skill in the art that many changes and modifications can be made thereto without departing from the spirit or scope of the invention.
ACCORDINGLY,

What is claimed as new and intended to be covered by Letters Patent is:

1. A heat shock resistant heat fused refractory product which comprises:
   1. periclase crystals formed by resolidifying a molten refractory material containing a major portion periclase crystals, MgO,
   2. tabular or needle-shaped CaO:$Cr_2O_3$ crystals in the periclase crystals, and
   3. coarse magnesia particles dispersed in the resolidified structure which comprises a base crystal structure of periclase crystals and CaO·$Cr_2O_3$ crystals and said resolidified structure consisting essentially of more than 50% by weight MgO, 5 – 40% by weight CaO, more than 3% by weight $Cr_2O_3$, wherein the quantity of $Cr_2O_3$ is greater than one-sixth the quantity of CaO, and is less than 5% by weight of the $Al_2O_3$, wherein the quantity of CaO is more than 3 times the quantity of $Cr_2O_3$.

2. The heat shock resistant heat fused refractory product of claim 1, wherein the base crystal structure consists essentially of, by weight:

60 – 80% of MgO
5 – 25% of CaO
more than 65% of MgO + CaO
$Cr_2O_3 > 1/6$ CaO
less than 4% of $SiO_2$ 3. The heat shock resistant heat fused refractory product of claim 1, wherein the coarse magnesia particles are present in the product in the range of 6 – 10% by volume of total refractory product.

4. The heat shock resistant heat fused refractory product of claim 3, wherein the coarse magnesia particles is magnesia clinker of more than 94% purity, and 1 – 20 mm. in average particle size.

* * * * *